(12) United States Patent  
Okada

(10) Patent No.: US 6,483,226 B1
(45) Date of Patent: Nov. 19, 2002

(54) IMPACT ACTUATOR AND EQUIPMENT USING THE IMPACT ACTUATOR

(75) Inventor: Hiroyuki Okada, Izumi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/536,925

(22) Filed: Mar. 28, 2000

(30) Foreign Application Priority Data

Mar. 30, 1999 (JP) ............................................. 11-089626
Sep. 24, 1999 (JP) ............................................. 11-271184

(51) Int. Cl.$^7$ .......................... H02N 2/00; H01H 47/32
(52) U.S. Cl. ........................ 310/328; 310/317; 361/152
(58) Field of Search ........................... 310/328, 316.01, 310/316.02, 316.03, 317, 318; 361/152; 77/154; 11/155

(56) References Cited

U.S. PATENT DOCUMENTS

| 4,706,561 A | * 11/1987 | Greer ....................... 101/93.01 |
| 4,764,840 A | * 8/1988 | Petrie et al. ................. 123/490 |
| 5,130,619 A | * 7/1992 | Izuno ....................... 310/316.02 |
| 5,490,031 A | * 2/1996 | Braun et al. ................. 307/131 |
| 5,589,723 A | 12/1996 | Yoshida et al. .............. 310/328 |
| 5,786,654 A | 7/1998 | Yoshida et al. .............. 310/328 |
| 5,917,267 A | * 6/1999 | Miyazawa et al. ........... 310/317 |
| 5,969,464 A | * 10/1999 | Nakano et al. ......... 310/316.01 |
| 6,011,345 A | * 1/2000 | Murray et al. ............... 310/321 |
| 6,111,336 A | * 8/2000 | Yoshida et al. .............. 310/328 |
| 6,140,750 A | * 10/2000 | Ueyama ...................... 310/369 |

FOREIGN PATENT DOCUMENTS

| JP | 01-278269 A | 11/1989 |
| JP | 04-222477 A | 8/1992 |
| JP | 06-123830 A | 5/1994 |
| JP | 06-178563 A | 6/1994 |
| JP | 08-043872 A | 2/1996 |
| JP | 10-225149 | 8/1998 |

* cited by examiner

Primary Examiner—Brian Sircus
Assistant Examiner—Michael C. Zarroli
(74) Attorney, Agent, or Firm—Sidley Austin Brown & Wood LLP

(57) ABSTRACT

In an impact actuator, a piezoelectric device is driven by providing a relatively large difference between the charging time for charging the piezoelectric device in the direction of polarization and the charging time in the reverse direction of polarization. Owing to the elasticity of the piezoelectric device and a driving member, an expansion speed becomes different from a contraction speed, so that a driven member engaged with the driving member by a friction force can be moved relative to the driving member.

14 Claims, 10 Drawing Sheets

IMPACT ACTUATOR AND EQUIPMENT USING THE IMPACT ACTUATOR

This application is based on patent applications Hei.11-89626 and 11-271184 filed in Japan, the contents of which are hereby incorporated by references.

BACKGROUND OF THE INVENTION

1. Field of the Invention

This invention relates to an impact actuator using piezoelectric device as a driving source and an equipment such as a camera or a binocular using the impact actuator.

2. Description of the Related Art

An impact actuator using a piezoelectric device as a driving source is conventionally known. In the impact actuator, a driven member is movably coupled with a rod shaped driving member in an axial direction of the driving member. A piezoelectric device is fixed on an end of the driving member in a manner so that a direction of polarization of the piezoelectric device coincides with an axial direction of the driving member.

FIG. 11 shows a schematic configuration of a conventional impact actuator. FIGS. 12 and 13 show examples of circuit diagram of a slow charging circuit in FIG. 11. FIG. 14 shows an example of a slow discharging circuit in FIG. 11.

As can be seen from FIG. 11, the conventional impact actuator 100 comprises a rod shaped driving member 101, a driven member 102, a laminated piezoelectric device 103 and a driving circuit 104. The driven member 102 is coupled with the driving member 101 by a predetermined friction force. When a force acting on the driven member 102 is larger than the friction force, the driven member 102 can be slid on the driving member 101 in an axial direction thereof. An object such as the taking lens to be driven is fixed on the driven member 102. The piezoelectric device 103 is fixed on a base end 101b of the driving member 101 in a manner so that a direction of polarization of the piezoelectric device 103 coincides with the axial direction of the driving member 101. A pair of electrodes 103a and 103b are formed on both ends of the piezoelectric device 103. The electrode 103b is grounded and the electrode 103a is connected to the driving circuit 104.

The driving circuit 104 comprises a forward driver 105, a backward driver 106 and a controller 107 for controlling the drivers 105 and 106. The forward driver 105 drives the actuator so as to move the driven member 102 toward an open end 101a of the driving member 101. Hereinafter, the direction toward the open end 101a of the driving member 101 is called "forward". The backward driver 106 drives the actuator so as to move the driven member 102 toward the base end 101b of the driving member 101. Hereinafter, the direction toward the base end 101b of the driving member 101 is called "backward".

In the conventional impact actuator 100 relatively moves the driven member 102 with respect to the driving member 101 by utilizing the difference of the friction forces between the driving member 101 and the driven member 102 when the driving member 101 is vibrated by different speed. The friction force between the driven member 102 and the driving member 101 becomes smaller when the driving member 101 moves quickly, and it becomes larger when the driving member 101 moves slowly. Thus, the driven member 102 moves with the driving member only when the driving member 101 moves slowly. When the driving member 101 repeats the slow forward movement and the quick backward movement in the forward driving operation, the driven member 102 relatively moves forward (forward driving operation). When the driving member 101 repeats the quick forward movement and the slow backward movement in the backward driving operation, the driven member 102 relatively moves backward (backward driving operation).

The forward driver 105 comprises a slow charger 105a and a quick discharger 105b. The backward driver 106 comprises a quick charger 106a and a slow discharger 106b. The slow charger 105a and the quick charger 106a respectively apply a voltage of a power supply in the direction of polarization to the piezoelectric device 103 for expanding the piezoelectric device 103 in the axial direction of the driving member 101. The slow charger 105a is a constant current charging circuit shown in FIG. 12 or FIG. 13 for restricting a charging speed of the electric charge by controlling a value of a charging current.

FIG. 12 shows a constant current circuit configured by a pnp type transistor Tr1, a Zener diode ZD and resisters r1 to r3. The resisters r1 and r2 are biasing resisters of the transistor Tr1. The Zener diode ZD is connected in parallel with the resister r2 which is connected to a base of the transistor Tr1. By such a configuration, a base voltage of the transistor Tr1 is controlled at a fixed value by the Zener diode ZD, so that a voltage drop by the resister r1 can be stabilized. As a result, a collector current of the transistor Tr1 is controlled to be constant.

FIG. 13 shows another constant current circuit configured by a pnp type transistor Tr1, an npn type transistor Tr2 and resisters r1 and r3. A parallel circuit of the resistor r2 and the Zener diode ZD in FIG. 12 is replaced by the transistor Tr2. A base and a collector of the transistor Tr2 are respectively connected to an emitter and a base of the transistor Tr1. An emitter of the transistor Tr2 is connected to a power supply Vp. A base voltage of the transistor Tr1 is controlled to be a constant value by the transistor Tr2, so that a voltage drop by the resister r1 can be stabilized. As a result, a collector current of the transistor Tr1 is controlled to be constant.

The quick discharger 105b and the slow discharger 106b respectively apply a voltage in a reverse direction of polarization to the piezoelectric device 103 for contracting the piezoelectric device 103. The slow discharger 106b is a constant current discharging circuit shown in FIG. 14 for restricting a discharging speed of the electric charge by controlling a value of a discharging current.

FIG. 14 shows a constant current circuit configured by an npn type transistor Tr3, a Zener diode ZD and resisters r4 and r5. The resister r4 restricts the discharging current. A voltage of a base of the transistor Tr3 is controlled to be a predetermined value by the Zener diode ZD, so that a voltage drop by the resister r4 can be stabilized. As a result, an emitter current flowing the resister r4, which is the discharging current, is controlled to be constant.

The controller 107 controls the operations of the forward driver 105 and the backward driver 106. When the driven member 102 is to be moved forward, the controller 107 alternately drives the slow charger 105a and the quick discharger 105b. When the driven member 102 is to be moved backward, the controller 107 alternately drives the quick charging circuit 106a and the slow discharger 106b.

When the slow charger 105a and the quick discharger 105b are alternately driven in a forward driving operation, the piezoelectric device 103 repeats slow expansion and quick contraction alternately. Thus, the driving member 101 repeats a slow forward movement and a quick backward movement. On the contrary, when the quick charger 106a and the slow discharger 106b are alternately driven in a backward driving operation, the piezoelectric device 103 repeats quick expansion and slow contraction alternately. Thus, the driving member 101 repeats a quick forward movement and a slow backward movement.

Accordingly, the driven member 102 relatively moves forward with respect to the driving member 101 in the forward driving operation, and the driven member 102 relatively moves backward with respect to the driving member 101 in the backward driving operation.

When the impact actuator is used as an actuator for moving an optical lens system of a handy equipment such as camera or a binocular, it is preferable that the driving circuit is simple and small with regard to lightening and downsizing of the equipment. The driving circuit 104 of the conventional impact actuator, however, is configured to restrict the charging current and the discharging current by the constant current circuits, so that it needs many elements constituting the driving circuit 104. Thus, it is difficult to lightening and downsizing the driving circuit 104.

SUMMARY OF THE INVENTION

An object of this invention is to provide an impact actuator and an equipment using the impact actuator which can be lightened and downsized.

An impact actuator in accordance with an aspect of this invention comprises a piezoelectric device, a driving member fixed on an end of the piezoelectric device in a direction of polarization of the piezoelectric device, a friction member engaged with the driving member by a friction force and causing a relative movement in an axial direction of the driving member, and a driving apparatus.

The driving apparatus comprises a first driver for applying a voltage in a direction of polarization of a piezoelectric device for charging and discharging electric charge to and from the piezoelectric device at a predetermined charging speed, a second driver for applying a voltage in a reverse direction of polarization of the piezoelectric device for charging and discharging electric charge to and from the piezoelectric device at the substantially the same charging speed as that of the first driver, and a controller for controlling the first driver and the second driver alternatively in different driving time periods.

The friction member can be moved relative to the driving member under a predetermined condition when the piezoelectric device of the impact actuator is driven by providing a relatively large difference between the charging time for charging the piezoelectric device in the direction of polarization and the charging time in the reverse direction of polarization.

The above-mentioned configuration of the driving apparatus needs no current restricting element such as a resistor for restricting charge or discharge speed of electric charges, so that the configuration of the driving apparatus becomes very simple. Consequently, the impact actuator and an equipment using the impact actuator can be lightened and downsized.

DETAILED DESCRIPTION OF THE EMBODIMENT

An embodiment of this invention is described with reference to the figures.

Figure 1:
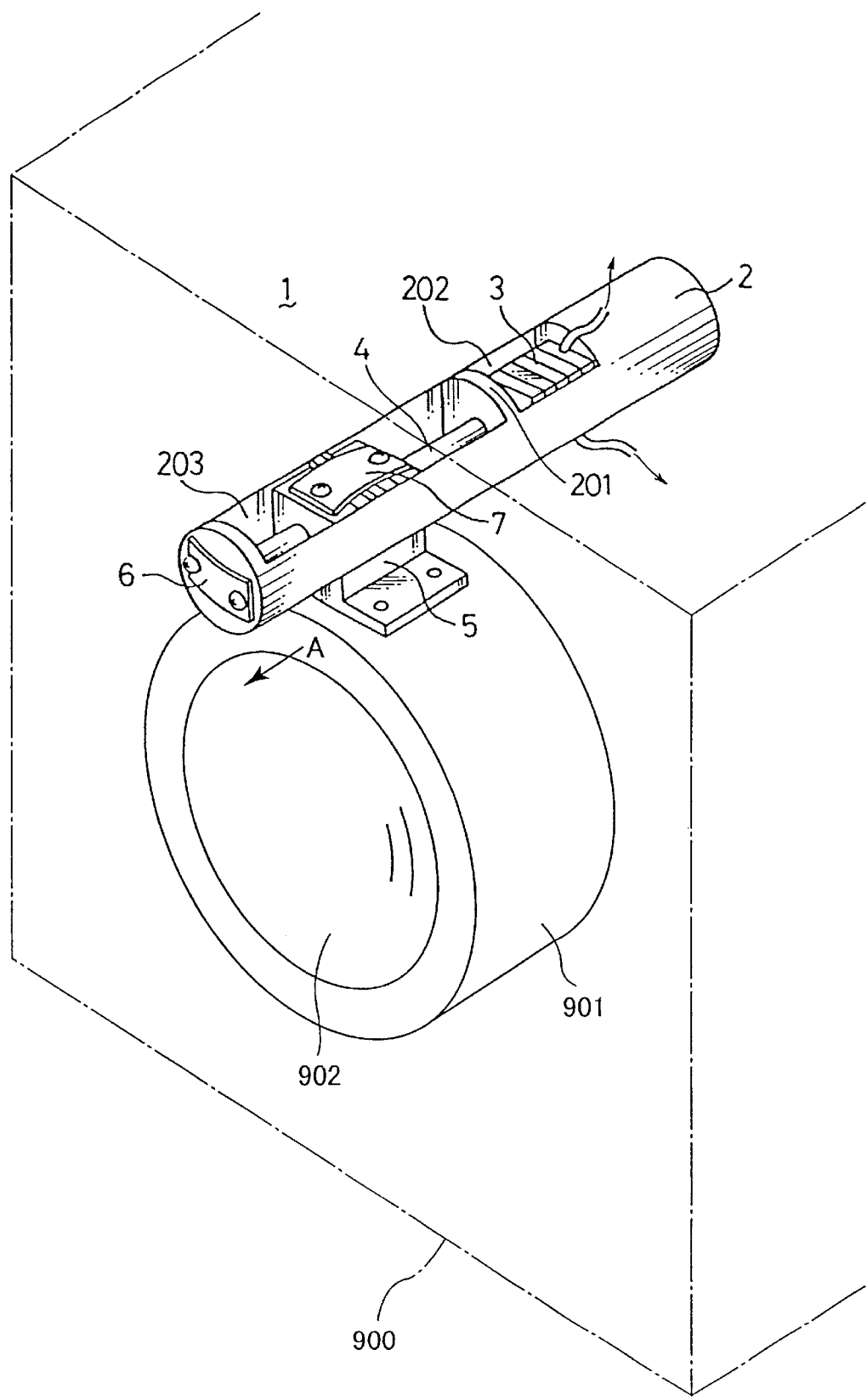
FIG. 1 is a perspective view for showing a configuration of an impact actuator used in an equipment such as a camera in an embodiment of this invention.

A configuration of an impact actuator 1 used in an equipment such as a camera in this embodiment is shown in FIG. 1. A rod shaped stationary member 2 is hollowed except both ends and a center partition 201 for forming a first cavity 202 and a second cavity 203. A piezoelectric device 3 is provided in the first cavity 202 in a manner so that a direction of piling up of ceramic thin plates coincides with an axial direction of the stationary member 2 and a base end of the piezoelectric device 3 is fixed on the stationary member 2. A rod shaped driving member 4 and a driven member 5 which is engaged with an outer cylindrical face of the driving member 4 are provided in the second cavity 203. The driving member 4 penetrates holes serving as bearings of the driving member 4 and formed on the center partition 201 and an end face of second cavity 203 of the stationary member 2. An end of the driving member 4 contacts a top end of the piezoelectric device 3 and the other end of the driving member 4 penetrates and protrudes a little from the stationary member 2. Thus, the driving member 4 is movable in the axial direction thereof shown by arrow "A" in FIG. 1. The driven member 5 is connected to a frame 901 of a taking lens 902 of a camera 900. Thus, the taking lens 902 can be moved, for example, for focusing an image of an object on a film plane.

Figure 2:
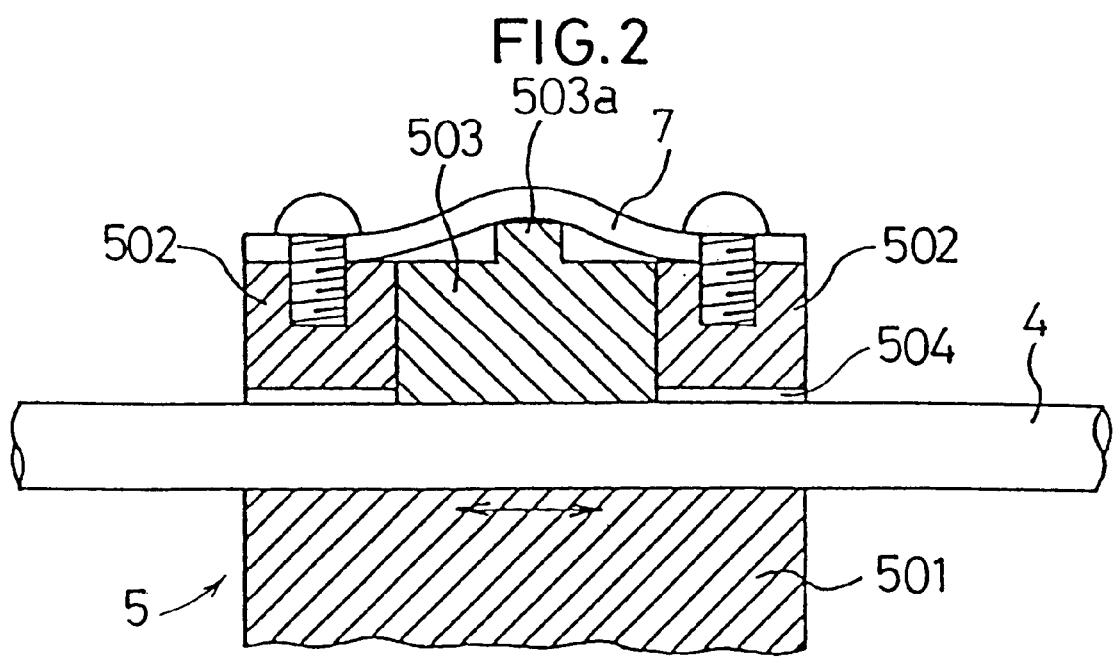
FIG. 2 is a sectional view for showing a configuration of a coupling mechanism of a driving member and a driven member in the impact actuator shown in FIG. 1.

Detailed configuration of a coupling mechanism of the driving member 4 and the driven member 5 of the impact actuator 1 is shown in FIG. 2. The driven member 5 comprises a base member 501, a friction member 503 and a plate spring 7. The base member 501 has two walls 502 formed on both ends thereof in a direction parallel to the axial direction of the driving member 4. The friction member 503 has a protrusion 503a contacting the plate spring 7 and receiving a pressure from the plate spring 7. A bearing hole 504 having a circular cross-section is formed on each wall 502 through which the driving member 4 penetrates. Circular concave faces having the same radius are respectively formed on a portion of the friction member 503 and on a portion of the base member 501 between the walls 502 for facing each other. The driving member 4 is nipped between the base member 501 and the friction member 503 by a pressure of the plate spring 7.

As shown in FIG. 1, another plate spring 6 is provided on the outer face of the top end of the second cavity 203 of the stationary member 2 for applying a pressing force to the driving member 4 toward the piezoelectric device 3 in the axial direction thereof.

By such a configuration, the driving member 4 is held by the driven member 5 with a pressure suitable for impact sliding motion. When the driving member 4 is quickly moved in a first direction by the displacement of the piezoelectric device 3, the driven member 5 cannot move with the driving member 4 due to inertia thereof. Thus, the driven member 4 relatively slides on the driving member 5. On the other hand, when the driving member 4 is slowly moved in a second direction opposite to the first direction by the displacement of the piezoelectric device 3, the driven member 5 can move with the driving member 4 by the friction force generated between them. By repeating these motions, the driven member 5 is moved in the second direction.

In the above-mentioned configuration, the shape of the section of the driving member 4 is described as circular. It, however, is possible to form the driving member 4 having an elliptic or a rectangular section. Furthermore, in the above-mentioned configuration, the plate spring 7 is used for pressing the friction member 503 of the driven member 5 to the driving member 4. It, however, is possible to use any element which can generate a pressing force. For example, an elastic member such as a coil spring and a rubber block can be used.

Figure 3:
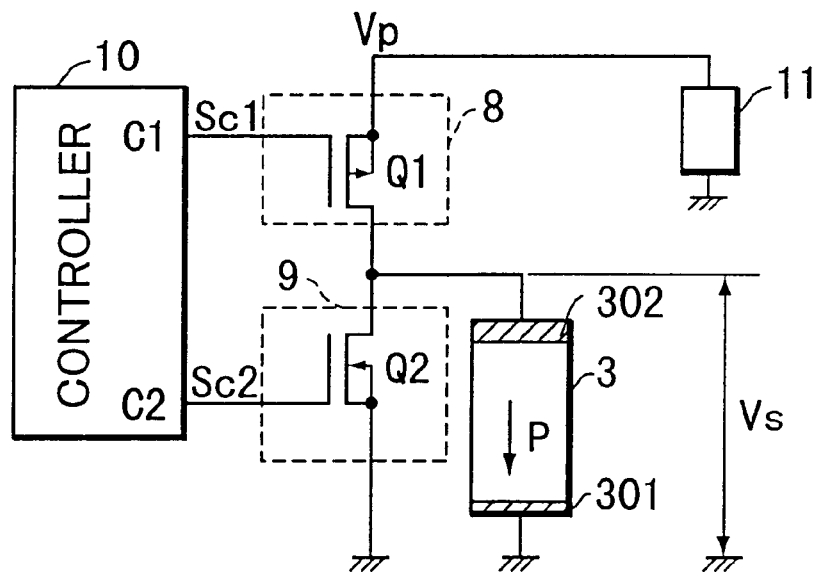
FIG. 3 is a circuit diagram for showing a configuration of a driving apparatus in the embodiment.

A circuit diagram of a configuration of a driving apparatus for driving the piezoelectric device 3 of the impact actuator 1 is shown in FIG. 3. The driving apparatus comprises a charger 8 for charging electric charge into the piezoelectric device 3 in a direction of polarization thereof, a discharger 9 for discharging the electric charge from the piezoelectric device 3 and a controller 10 for controlling the charger 8 and the discharger 9. A pair of electrodes 301 and 302 are respectively provided at both ends of the piezoelectric device 3 in a direction of polarization thereof. The electrode 301 positioned forward with respect to the direction of polarization shown by arrow P in FIG. 3 is grounded. The electrode 302 positioned backward with respect to the direction shown by arrow P is connected to the charger 8 and the discharger 9. The controller 10 alternatively outputs a driving control signal Sc1 to the charger 8 and a driving control signal Sc2 to the discharger 9. By switching on and off of the charger 8 and the discharger 9, the piezoelectric device 3 expands and contracts.

The charger (first driver) 8 applies a voltage Vp of a power supply to the electrode 302 for charging the piezoelectric device 3 in the direction of polarization for strengthening the polarization. The discharger (second driver) 9 grounds the electrode 301 for discharging the electric charge from the piezoelectric device 3 quickly. In other words, the second driver applies a voltage to the piezoelectric device 3 in the reverse direction to the voltage between the electrodes 301 and 302.

The charger 8 is configured by a switching element Q1 which is a P-channel MOS-FET (Field Effect Transistor) and an electric power supply 11 connected to the switching element Q1. The discharger 9 is configured by a switching element Q2 of an N-channel MOS-FET in which a source terminal thereof is grounded. In this example, the MOS-FETs are used as the switching elements Q1 and Q2. It, however, is possible to use another switching device such as a bipolar transistor, a junction FET or a GTO (Gate Turn-off Transistor).

The electrode 301 of the piezoelectric device 3 is grounded. The electrode 302 of the piezoelectric device 3 is connected to drain terminals of the switching elements Q1 and Q2. Gate terminals of the switching elements Q1 and Q2 are respectively connected to control terminals C1 and C2 of the controller 10. A source terminal of the switching element Q1 is connected to the power supply 11, and a source terminal of the switching element Q2 is grounded. When the driving control signals Sc1 and Sc2 are inputted to the switching elements Q1 and Q2 from the control terminals C1 and C2 of the controller 10, connection of the charger 8 and the discharger 9 to the piezoelectric device 3 is controlled.

As can be seen from FIG. 3, the charger 8 and the discharger 9 include no current restricting element such as a resistor, so that the circuit diagram can be made simple. Consequently, the driving apparatus can be simplified and lightened, and the impact actuator 1 and an equipment using the impact actuator 1 can be downsized.

The controller 10 alternately driving the charger 8 and the discharger 9 by the driving control signals Sc1 and Sc2 in a manner so that driving time periods of the charger 8 and the discharger 9 are different from each other.

Figure 4:
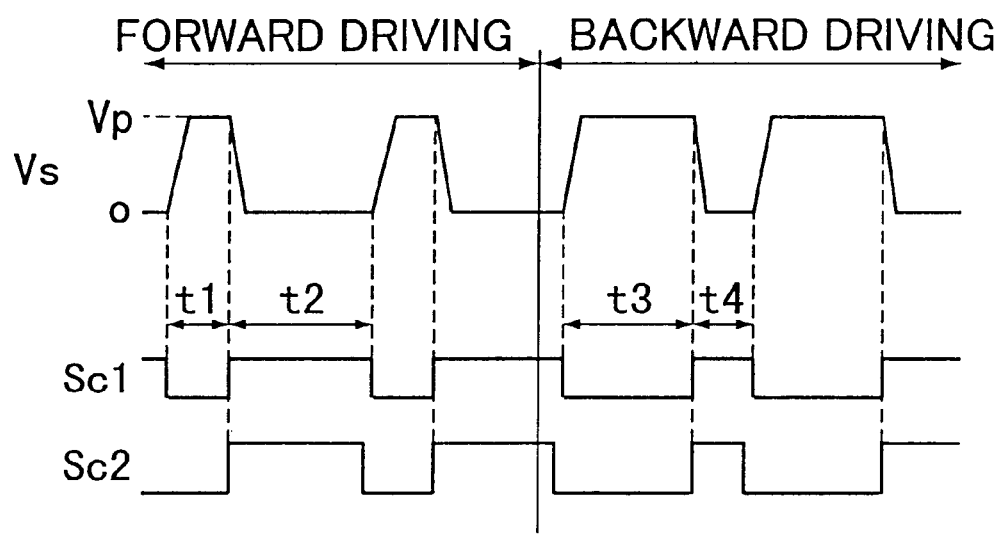
FIG. 4 is a timing chart for showing waveforms of driving control signals and a voltage between electrodes of a piezoelectric device of the impact actuator.

Wave forms of the driving control signals Sc1 and Sc2 and a variation of the voltage Vs between the electrodes 301 and 302 of the piezoelectric device 3 are shown in FIG. 4.

As can be seen from FIG. 4, the driving signals Sc1 and Sc2 are respectively rectangular wave signals having different duty ratio but the same phase. The duty ratio D is defined as a ratio of an ON time $T_{ON}$ of the charger 8 with respect to a total time $T_{ON}+T_{OFF}$ of one cycle of expanding and contracting of the piezoelectric device 3 ($T_{OFF}$ is an OFF time of the charger 8).

When the driven member 5 is moved forward toward the top end of the stationary member 2, the duty ratio $D=T_{ON}/(T_{ON}+T_{OFF})=t1/(t1+t2)$ is set to be smaller than 0.5. Hereupon, the time t1 is the ON time of the charger 8 and the time t2 is an ON time of the discharger 9 that is an OFF time of the charger 8. On the contrary, when the driven member 5 is moved backward toward the base end of the stationary member 2, the duty ratio $D=t3/(t3+t4)$ is set to be larger than 0.5. Hereupon, the time t3 is the ON time of the charger 8 and the time t4 is the ON time of the discharger 9.

Since the switching element Q1 is the P-channel MOS-FET, it is switched on when the driving control signal Sc1 is a low level. Since the switching element Q2 is the N-channel MOS-FET, it is switched on when the driving control signal Sc2 is a high level.

In this embodiment, the charging speed for charging the electric charge to the piezoelectric device 3 and the discharging speed for discharging the electric charge from the piezoelectric device 3 are substantially the same. Thus, the impact actuator 1 is controlled by the duty ratio D. Applicants have found that the driven member 5 can be moved relative to the driving member 4 under a predetermined condition when the piezoelectric device 3 of the impact actuator 1 is driven by providing a relatively large difference between the charging time for charging the piezoelectric device in the direction of polarization and the charging time in the reverse direction of polarization.

Figure 5:
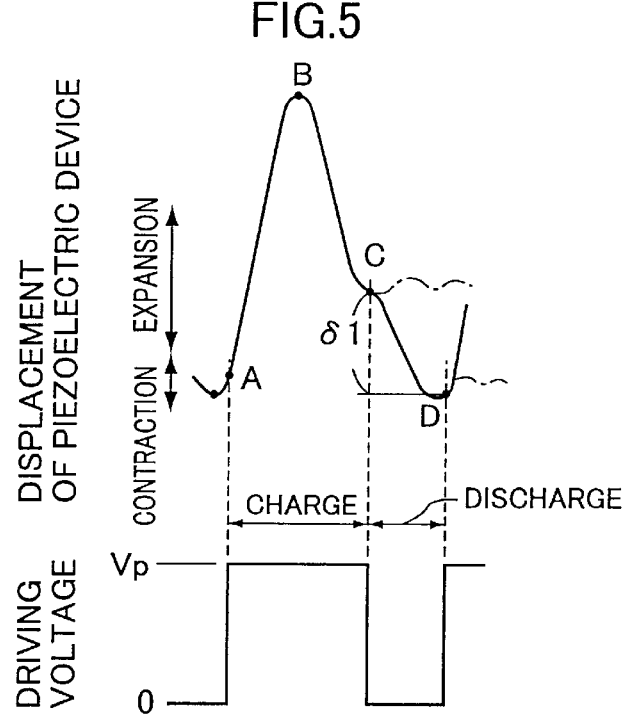
FIG. 5 is a timing chart for showing waveforms of a transient displacement of the piezoelectric device and a driving signal applied to the piezoelectric device in the embodiment.

FIG. 5 shows a transient response of displacement of the piezoelectric device 3 when a driving control signal having substantially the same charging and discharging speeds but different charging and discharging times is applied thereto. The rectangular wave signal illustrated in a lower potion in FIG. 5 shows one cycle of the driving signal for driving the piezoelectric device 3 having a predetermined duty ratio in which the charging time is longer than the discharging time. The waveform illustrated in an upper portion in FIG. 5 shows a transient expansion and contraction of the piezoelectric device 3 when the rectangular driving control signal is applied to the piezoelectric device 3. The waveform of the transient expansion and contraction of the piezoelectric device 3 and the driving member 4 is illustrated as a basic waveform of a resonance frequency of them.

When the piezoelectric device 3 is charged by applying a driving voltage +Vp in the direction of polarization, the piezoelectric device 3 expands. When the electric charge in the piezoelectric device 3 is discharged by grounding the piezoelectric device 3, the piezoelectric device 3 contracts. The piezoelectric device 3 and the driving member 4, however, has elasticity. When the expansion phenomenon is transiently considered, the piezoelectric device 3 expands a predetermined length by vibration at predetermined resonance frequency defined by own property. As shown in FIG. 5, when the driving voltage +Vp is applied to the piezoelectric device 3 at a point "A", the piezoelectric device 3 quickly and largely expands. When the expansion of the piezoelectric device 3 reaches to a peak at a point "B", the piezoelectric device 3 turns to contract. After that, the displacement of the piezoelectric device 3 converges to a value close to a point "C" by repeating the expansion and contraction, transiently (see a waveform from point "C" illustrated by one dotted chain line in FIG. 5). Such transient phenomenon applies to the contraction of the piezoelectric device 3. When the piezoelectric device 3 is grounded after being charged, the piezoelectric device 3 quickly and largely contracts. After that, the piezoelectric device 3 turns to expand at a predetermined displacement, and converges to a predetermined quantity of contraction by repeating the expansion and contraction transiently (see a waveform from point "D" illustrated by one dotted chain line in FIG. 5).

In the waveform shown in FIG. 5, the piezoelectric device 3 quickly expands from the point "A" to the point "B" at an expansion speed and contracts to the point "C" at a contraction speed slower than the expansion speed. A gradient of a curve between the point "A" to the point "B" is larger than a gradient of a curve between the point "B" to the point "C". When it is assumed that the expansion and the contraction of the piezoelectric device 3 occur in the same time period, it is considered that the quantity of contraction becomes smaller than the quantity of the expansion of the piezoelectric device owing to the elasticity of the piezoelectric device 3.

When the piezoelectric device 3 is grounded or applied a voltage of 0V at the point "C" at which the contraction operation of the piezoelectric device 3 is completed, the electric charge in the piezoelectric device 3 is started to be discharged, so that the piezoelectric device 3 further contracts to the point "D" from the point "C". A time period between the point "A" to the point "C" substantially corresponds to one frequency of a resonance frequency of the piezoelectric device 3 when it is charged in the direction of polarization. A quantity of expansion δ1 of the piezoelectric device 3 is similar to a quantity of contraction thereof when it is regularly discharged. Thus, the contraction speed between the point "C" to the point "D" becomes slower than the expansion speed between the point "A" to the point "B". A gradient of a curve between the point "C" and the point "D" becomes smaller than the gradient of the curve between the point "A" and the point "B".

When the voltage of Vp is applied to the piezoelectric device 3 at the point "D" again, at which the contraction operation of the piezoelectric device 3 is completed, the piezoelectric device 3 is started to be charged, so that the piezoelectric device 3 expands quickly. A time between the point "C" to the point "D" substantially corresponds to a half of one frequency of a resonance frequency of the piezoelectric device 3 when it is charged in the reverse direction of polarization.

When the driving signal is continuously applied, the piezoelectric device 3 repeats the above-mentioned expansion and contraction. Waveforms of the driving signal, the variation of the displacement of the piezoelectric device 3 and the motion of the driven member 5 are shown in FIG. 6.

In the above-mentioned expansion and contraction of the piezoelectric device 3, the contraction speed is slower than the expansion speed. When the driving member 4 quickly moves, the friction force between the driving member 4 and the driven member 5 is smaller. On the contrary, when the driving member 4 slowly moves, the friction force between the driving member 4 and the driven member 5 is larger. The driven member 5 moves, for example, backward with the driving member 4 only when the driving member 4 is slowly moved backward and it stays at the position by inertia thereof when the driving member 4 is quickly moved forward. By repeating the quick forward movement and the slow backward movement of the driving member 4 corresponding to the quick expansion and slow contraction of the piezoelectric device 3, the driven member 5 moves backward consequently.

Figure 6:
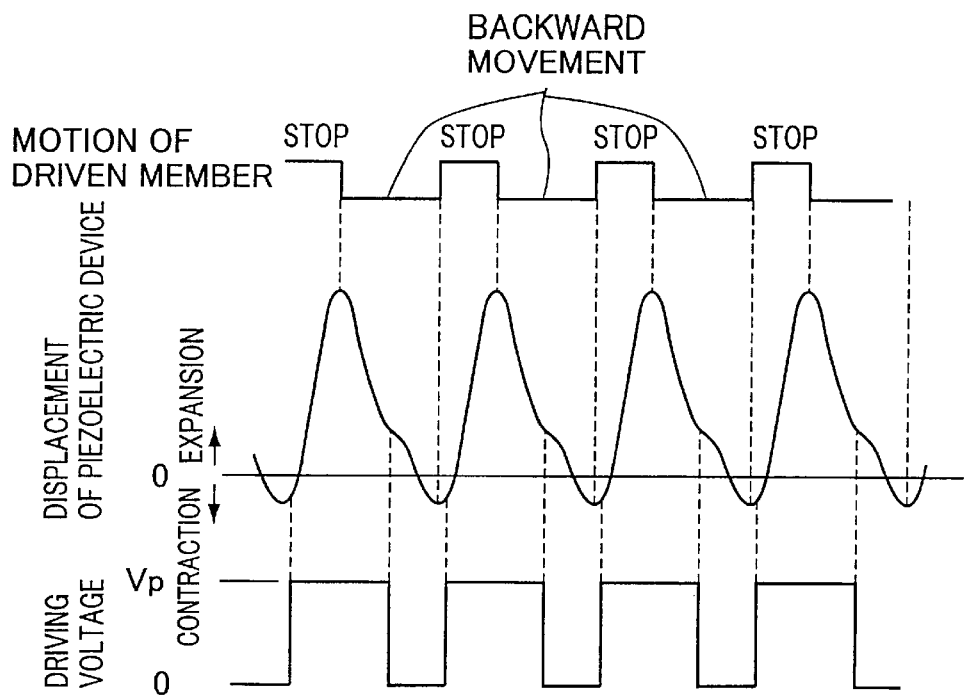
FIG. 6 is a timing chart for showing waveforms of the displacement of the piezoelectric device, the driving signal applied to the piezoelectric device and the motion of the driven member in the embodiment.

The above-mentioned explanation with respect to FIG. 6 is an example when the piezoelectric device 3 is driven by using the driving control signals having the duty ratio larger than 0.5 in which the charging time is longer than the discharging time. Alternatively, when the piezoelectric device 3 is driven by using the driving control signals having the duty ratio smaller than 0.5 in which the charging time is shorter than the discharging time, the discharging speed for discharging the electric charge from the piezoelectric device 3 becomes faster than the charging speed for charging the electric charge into the piezoelectric device 3. Thus, the piezoelectric device 3 quickly contracts during the discharge operation and slowly expands during the charging operation. Subsequently, the driven member 5 is moved forward relative to the driving member 4 by the reciprocal movement owing to the repeating of the expansion and contraction of the piezoelectric device 3.

Accordingly, when the driving control signals Sc1 and Sc2 having the duty ratio D smaller than 0.5 is inputted to the switching elements Q1 and Q2 from the controller 10 in FIG. 4, the piezoelectric device 3 repeats the quick contraction and slow expansion. Consequently, the driven member 5 moves forward toward the top end of the stationary member 2. Alternatively, when the driving control signals Sc1 and Sc2 having the duty ratio D larger than 0.5 is inputted to the switching elements Q1 and Q2 from the controller 10, the piezoelectric device 3 repeats the quick expansion and slow contraction. Consequently, the driven member 5 moves backward toward the base end of the stationary member 2.

For moving the driven member 5 in a desired direction stably, it is preferable that the charging time is substantially the same as the time for one cycle of the resonance frequency of the piezoelectric device 3 when it is charged in the direction of polarization (see the time period between the point "A" and the point "C" in FIG. 5) and the discharging time is substantially the same as half of the time for one cycle of the resonance frequency of the piezoelectric device 3 when it is charged in the reverse direction of polarization (see the time period between the point "C" and the point "D" in FIG. 5). The waveform of the displacement of the piezoelectric device 3, however, is distorted by components of other frequency superposed on the waveform shown in FIG. 5 caused by a structure for fixing the piezoelectric device 3 on the stationary member 2 and the driving member 4, and so on. Thus, the driving signal for driving the piezoelectric device 3 is adjusted with respect to each impact actuator 1.

Even when the duty ratio D of the charging time in the driving control signal is not precisely related to the resonance frequency of the piezoelectric device 3, it is possible to move the driven member 5 forward and backward corresponding to the duty ratio D.

Furthermore, it is possible to move the driven member 5 in the reverse directions by the same driving control signals corresponding to the structure and the condition of the piezoelectric device 3, the driving member 4 and the driven member 5. That is, the driven member 5 can be moved backward by the driving control signals having the duty ratio smaller than 0.5 and forward by the driving control signals having the duty ratio D larger than 0.5.

Figure 7:
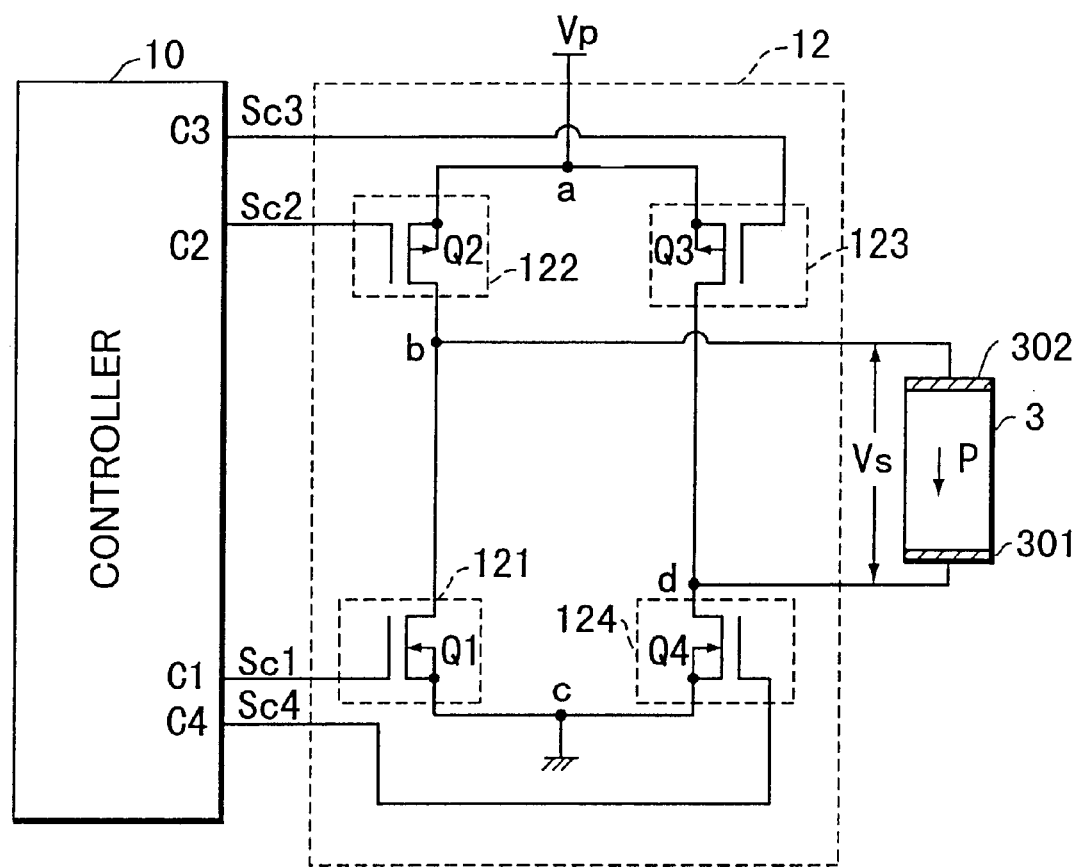
FIG. 7 is a circuit diagram for showing a configuration of a modification of the driving apparatus in the embodiment.

FIG. 7 shows a modification of the driving apparatus configured by a bridge circuit. The driving apparatus comprises a controller 10 and a bridge circuit 12.

The bridge circuit 12 comprises first to fourth circuits 121 to 124 for constituting a bridge circuit. The first circuit 121 and the second circuit 122 are connected as a series circuit. The third circuit 123 and the fourth circuit 124 are connected as a series circuit. Switching elements Q1 and Q4 in the first and fourth circuits 121 and 124 are N-channel MOS-FETs (Field Effect Transistors). Switching elements Q2 and Q3 in the second and third circuits 122 and 123 are P-channel MOS-FETs. A power supply (not shown in the figure) is connected between a connection point "a" of the second circuit 122 and the third circuit 123 and a connection point "c" of the first circuit 121 and the fourth circuit 124. The piezoelectric device 3 is connected between a connection point "b" of the first circuit 121 and the second circuit 122 and a connection point "d" of the third circuit 123 and the fourth circuit 124. Gate terminals of the switching elements (FETs) Q1 to Q4 in the first to fourth circuits 121 to 124 are respectively connected to control terminals C1 to C4 of the controller 10 so as to be inputted driving control signals Sc1 to Sc4.

The polarity of the power supply connected between the connection points "a" and "c" and the direction of polarization of the piezoelectric device 3 can optionally be set. For example, when a positive terminal of the power supply is connected to the connection point "a" for applying the voltage +Vp, the piezoelectric device 3 is polarized in a direction shown by arrow P in FIG. 7. The second circuit 122 and the fourth circuit 124 serve as a first driver for charging the electric charge to the piezoelectric device 3 by applying the voltage Vp of the power supply in the direction of polarization (direction for intensifying the polarization) until a voltage Vs between the electrodes 301 and 302 of the piezoelectric device 3 becomes equal to +Vp. The first circuit 121 and the third circuit 123 serve as a second driver for discharging the electric charge from the piezoelectric device 3 and charging the electric charge to the piezoelectric device 3 by applying the voltage Vp of the power supply in the reverse direction of polarization until the voltage Vs between the electrodes 301 and 302 of the piezoelectric device 3 becomes equal to −Vp.

When the connection of the piezoelectric device is inverted, the first circuit 121 and the third circuit 123 serve as the first driver for charging the piezoelectric device 3 in the direction of polarization, and the second circuit 122 and the fourth circuit 124 serve as the second driver for charging the piezoelectric device 3 in the reverse direction of polarization.

As mentioned above, when the driving apparatus is configured by the bridge circuit 12, the charging voltage from −Vp to +Vp is applied to the piezoelectric device 3. In other words, it is equivalent that the driving voltage of the piezoelectric device 3 becomes 2Vp. Consequently, an impact actuator outputting a larger displacement can be realized by a low driving voltage.

Figure 8:
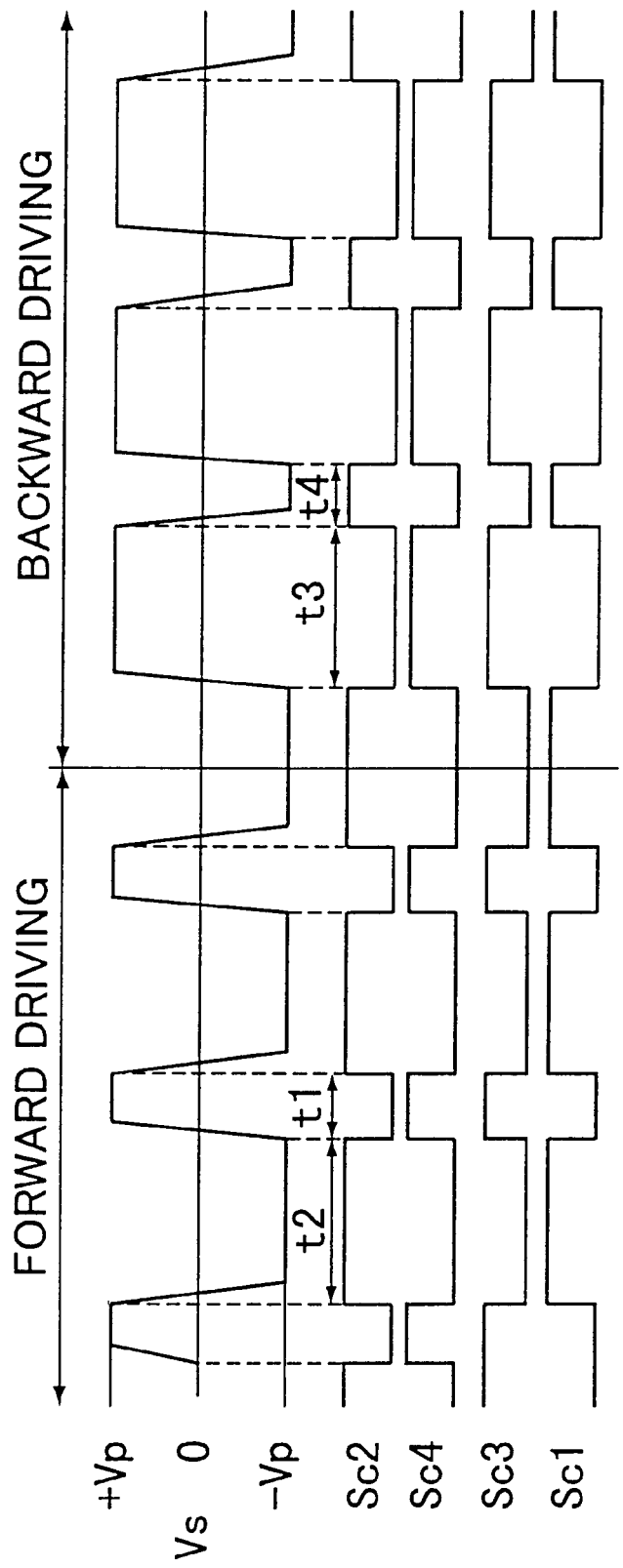
FIG. 8 is a timing chart for showing waveforms of driving control signals and a voltage between the electrodes of the piezoelectric device driven by the driving apparatus shown in FIG. 7.

Waveforms of the driving control signals Sc1 to Sc4 and a voltage Vs between the electrodes 301 and 302 of the piezoelectric device 3 are shown in FIG. 8. The waveforms shown in FIG. 8 are different from those shown in FIG. 3 at features described below.

The driving apparatus shown in FIG. 3 charges and discharges the piezoelectric device 3 so that the voltage Vs between the electrodes 301 and 302 of the piezoelectric device 3 is varied between 0 to +Vp. On the contrary, the driving apparatus using the bridge circuit shown in FIG. 7 charges and discharges the piezoelectric device 3 so that the voltage Vs between the electrodes 301 and 302 of the piezoelectric device 3 is varied between −Vp to +Vp. Since the application of the voltage Vp of the power supply to the piezoelectric device 3 in the direction of polarization is controlled by the second circuit 122 and the fourth circuit 124 and in the reverse direction of polarization is controlled by the first circuit 121 and the third circuit 123, the driving control signals Sc2 and Sc4 correspond to the driving control signal Sc1 in the driving apparatus shown in FIG. 3 and the driving control signals Sc1 and Sc3 correspond to the driving control signal Sc2 in the driving apparatus shown in FIG. 3.

The waveform of the driving control signal Sc2 in FIG. 8 is the same as that of the driving control signal Sc1 in FIG. 4, and the waveform of the driving control signal Sc1 in FIG. 8 is the same as that of the driving control signal Sc2 in FIG. 4. Since the switching element Q4 is the N-channel MOS-FET, the waveform of the driving control signal Sc4 has reverse phase to that of the driving control signal Sc2. Since the switching element Q3 is the P-channel MOS-FET, the waveform of the driving control signal Sc3 has a reverse phase to that of the driving control signal Sc1.

The driving mechanisms of the impact actuator by the driving apparatus shown in FIG. 7 are the same as those described above with reference to FIGS. 5 and 6, so that the explanation of the driving mechanisms are omitted. The driving voltage of the piezoelectric device 3 by the driving apparatus shown in FIG. 7 is equivalent to be 2Vp, so that the displacements of the expansion and contraction of the piezoelectric device 3 become double.

Figure 9:
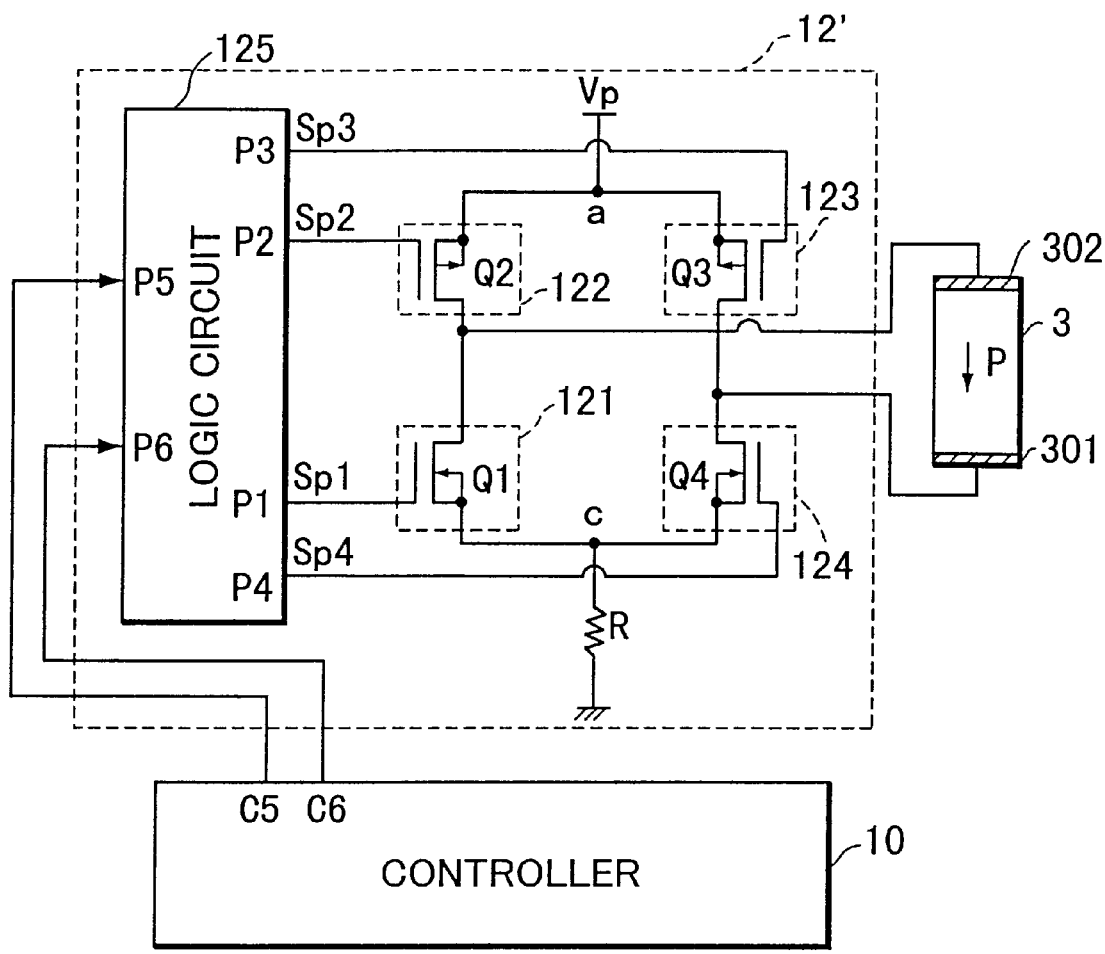
FIG. 9 is a circuit diagram for showing a configuration of another modification of the driving apparatus in the embodiment.

Another modification of a configuration of the driving apparatus is shown in FIG. 9. The driving apparatus comprises a controller 10, a bridge circuit 12' and a logic circuit 125 provided between the bridge circuit 12' and the controller 10. A resistor R is provided between the connection point "c" and the ground.

Gate terminals of the FETs (switching elements Q1 to Q4) in the first to fourth circuits 121 to 124 are respectively connected to output terminals P1 to P4 of the logic circuit 125 so as to input the driving control signals Sp1 to Sp4 from the logic circuit 125. Input terminals P5 and P6 of the logic circuit 125 are respectively connected to control terminals C5 and C6 of the controller 10 so as to input the driving control signals Sc5 and Sc6.

The circuit configured by the logic circuit 125 and the first to fourth circuits 121 to 124 (switching elements Q1 to Q4) has the same configuration as an H-bridge circuit widely used for driving a DC motor. Thus, it is possible to configure the driving circuit by a widely used H-bridge IC.

The resistor R is used for restricting the charging currents for charging the electric charge to the piezoelectric device 3 in the direction of polarization and in the reverse direction of polarization. Thus, the value of resistance of the resistor R is to be selected that the largest output can be obtained from the impact actuator 1 when it is driven by the driving apparatus shown in FIG. 10. A component of high frequency in the voltage applied to the piezoelectric device 3 can be reduced by the resistor R, so that the waveform of the displacement of the piezoelectric device 3 shown in FIG. 6 becomes gentle. Consequently, the distortion of the waveform of the transient displacement of the piezoelectric device 3 can be reduced.

When the impact actuator 1 can be output a large power sufficient to move an object to be moved, the resistor R can be removed. The configuration of the driving apparatus becomes very simple because of providing only the logic circuit 125 between the bridge circuit 12' and the controller 10.

The logic circuit 125 converts driving control signals Sc5 and Sc6 from the controller 10 to the driving control signals Sp1 to Sp4 by following the logic shown in table 1.

TABLE 1

| Sc5 | 1 | 0 | 1 | 0 |
|---|---|---|---|---|
| Sc6 | 1 | 1 | 0 | 0 |
| Sp1 (Q1) | High (ON) | Low (OFF) | High (ON) | Low (OFF) |
| Sp2 (Q2) | High (OFF) | Low (ON) | High (OFF) | High (OFF) |
| Sp3 (Q3) | High (OFF) | High (OFF) | Low (ON) | High (OFF) |
| Sp4 (Q4) | High (ON) | High (ON) | Low (OFF) | Low (OFF) |

Figure 10:
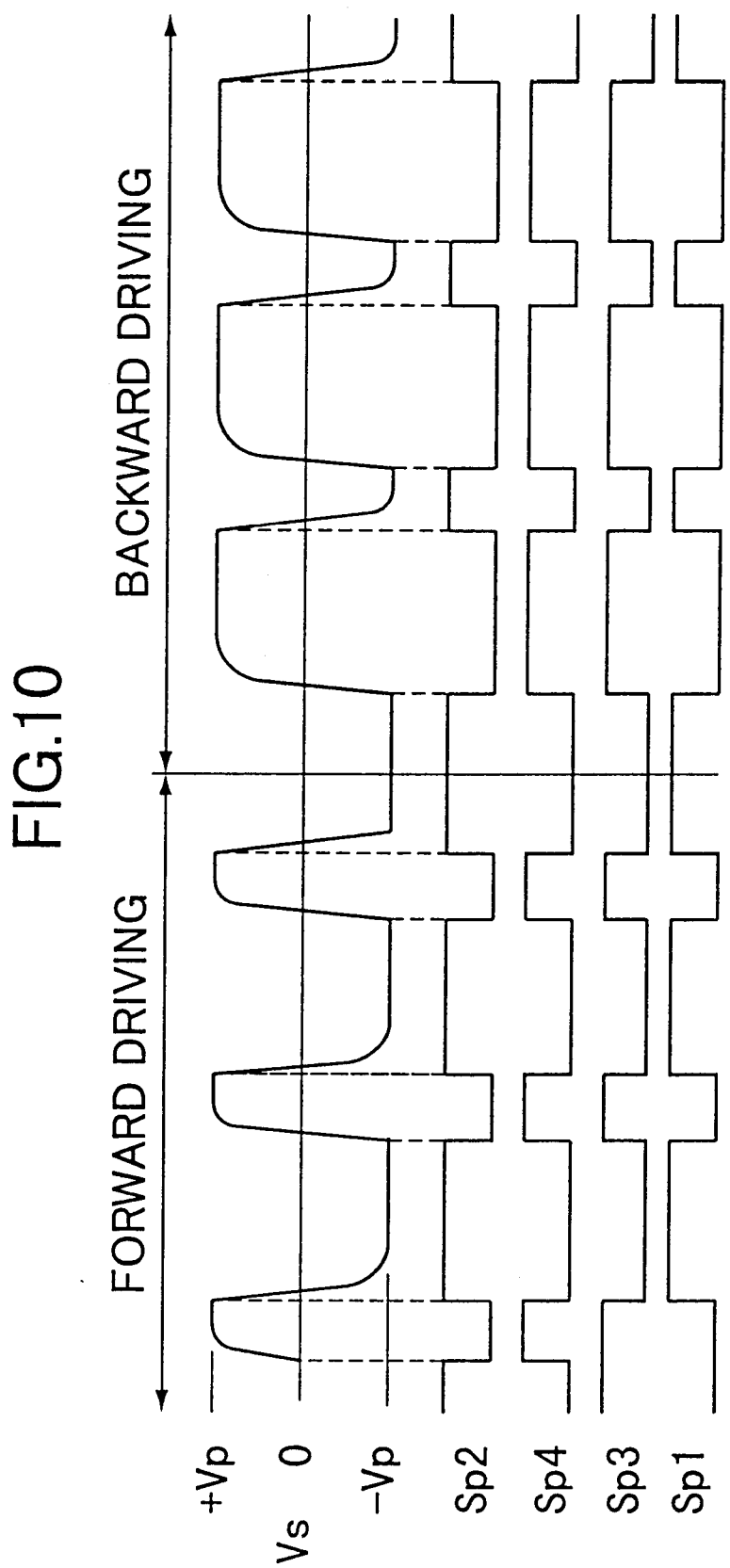
FIG. 10 is a timing chart for showing waveforms of driving control signals and a voltage between the electrodes of the piezoelectric device driven by the driving apparatus shown in FIG. 9.
Figure 11:
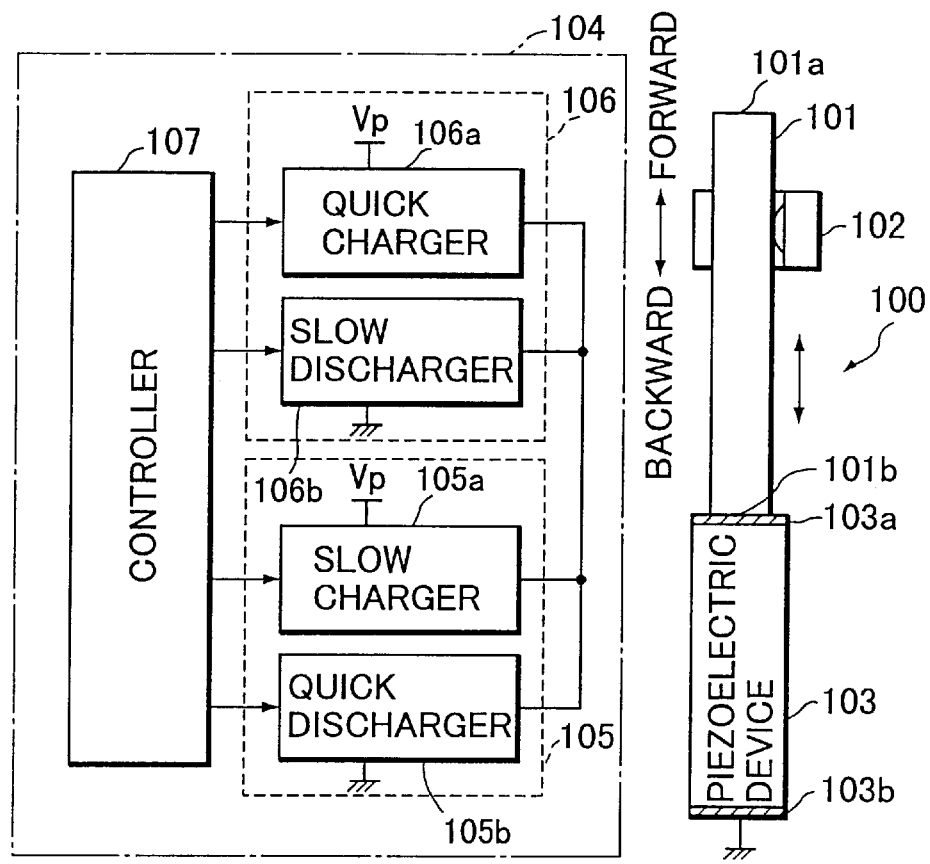
FIG. 11 is the block diagram for showing the schematic configuration of the conventional impact actuator.
Figure 12:
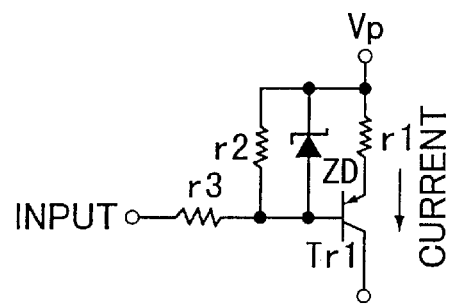
FIG. 12 is the circuit diagram for showing an example the slow charging circuit in FIG. 11.
Figure 13:
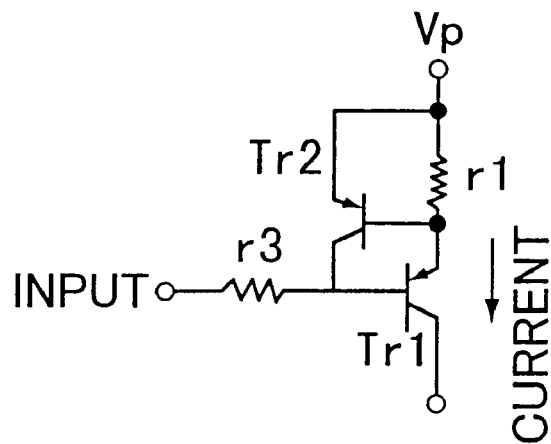
FIG. 13 is the circuit diagram for showing another example of the slow charging circuit in FIG. 11.
Figure 14:
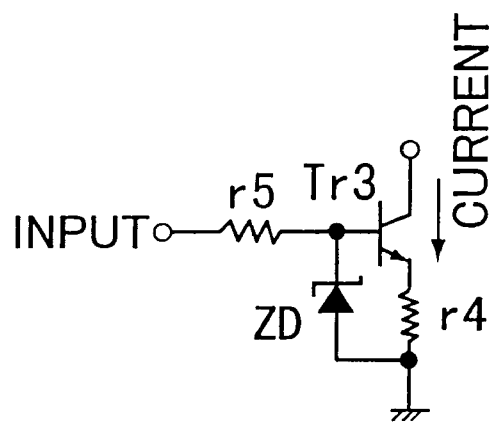
FIG. 14 is the circuit diagram for showing an example of the slow discharging circuit in FIG. 11.

Waveforms of the driving control signals Sp1 to Sp4 and a voltage Vs between the electrodes 301 and 302 of the piezoelectric device 3 are shown in FIG. 10.

Since the driving apparatus shown in FIG. 9 has substantially the same basic configuration as that shown in FIG. 7, the driving control signals Sp1 to Sp4 shown in FIG. 10 are substantially the same as the driving control signals Sc1 to Sc4 shown in FIG. 8. Since the charging current is restricted by the resistor R in the driving apparatus shown in FIG. 9, the voltage applied to the piezoelectric device 3 varies corresponding to a time constant defined by a resistance of the resistor R and a capacitance of the piezoelectric device 3 close to a turning point of the voltage applied to the piezoelectric device 3. Thus, edges of the waveform at a rising up portion to the voltage +Vp and at a falling down portion to the voltage −Vp of the voltage Vs between the electrodes 301 and 302 of the piezoelectric device 3 shown in FIG. 10 are gentle in comparison with those shown in FIG. 8. In case that the resistor R is removed from the driving apparatus shown in FIG. 9, the waveform of the voltage Vs between the electrodes 301 and 302 of the piezoelectric device 3 becomes the same as that shown in FIG. 8.

The driving mechanisms of the impact actuator by the driving apparatus shown in FIG. 9 are substantially the same as those driven by the driving apparatus shown in FIG. 7 except the waveform of the voltage Vs between the electrodes 301 and 302 of the piezoelectric device 3, so that the explanation of the driving mechanisms are omitted.

As mentioned above, the piezoelectric device 3 is charged in both of the direction of polarization and the reverse direction of polarization by substantially the same charging speed but different charging times. Thus, the configuration of the driving apparatus becomes more simple than that of the conventional driving circuit using the resistor for restricting the charging current. As a result, the impact actuator 1 driven by the driving apparatus and an equipment using the impact actuator 1 can be downsized and inexpensive.

Furthermore, in the above-mentioned description, the impact actuator 1 is fixed and the driven member 5 is moved. However, it is possible to constitute that the member 5 is stationary, and the impact actuator 1 is movable. For example, the member 5 is stationary provided for forming a moving path. The member 4 engages with the member 5 by a friction force so as to move along the moving path of the member 5. When the member 4 is reciprocally moved by expansion and contraction of the piezoelectric device 3, the impact actuator 1 including the piezoelectric device 3 and the member 4 relatively moves along the moving path of the member 5 by following the above-mentioned relation between the inertia and the friction force.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An impact actuator comprising:
    a piezoelectric element;
    a driving member fixed on a first end of the piezoelectric element,
    a supporting member fixed on a second end of the piezoelectric element;
    a friction member engaged with the driving member by a friction force for causing a relative movement in an axial direction of the driving member;
    a first driver for applying a voltage for charging or discharging electric charge to or from the piezoelectric element at a charging speed so as to deform the piezoelectric element in a first direction;

a second driver for applying a voltage for charging or discharging electric charge to or from the piezoelectric element at a charging speed that is substantially the same speed as that of the first driver so as to deform the piezoelectric element in a second direction opposite to the first direction; and a controller for alternately controlling the first driver and the second driver such that the first driver and the second driver have different driving time periods.

2. An impact actuator in accordance with claim 1, wherein the first driver comprises a first charging and discharging circuit for discharging electric charge in the piezoelectric element to deform the piezoelectric element in the second direction and for charging electric charge to the piezoelectric element to deform the piezoelectric element in the first direction; and the second driver comprises a second charging and discharging circuit for discharging electric charge in the piezoelectric element to deform the piezoelectric element in the first direction and for charging electric charge to the piezoelectric element to deform the piezoelectric element in the second direction.

3. An impact actuator in accordance with claim 1, wherein the first driver comprises a charging circuit for charging electric charge to the piezoelectric element to deform the piezoelectric element in the first direction; and the second driver comprises a discharging circuit for discharging electric charge in the piezoelectric element to deform the piezoelectric element in the first direction.

4. An impact actuator in accordance with claim 1, wherein a circuit for serving as the first driver and the second driver is configured as a bridge circuit comprising:

a first series circuit of a first subcircuit and a second subcircuit, each of the first subcircuit and the second subcircuit having a switching element; a second series circuit of a third subcircuit and a fourth subcircuit, each of the third subcircuit and the fourth subcircuit having a switching element; the piezoelectric element being connected between a connection point of the first subcircuit and the second subcircuit and a connection point of the third subcircuit and the fourth subcircuit, and an electric power supply connected between a connection point of the second subcircuit and the third subcircuit and a connection point of the first subcircuit and the fourth subcircuit;

the first driver comprises the electric power supply, the second subcircuit and the fourth subcircuit; and the second driver comprises the electric power supply, the first subcircuit and the third subcircuit.

5. An impact actuator in accordance with claim 1, wherein the controller alternately controls the first driver and the second driver so as to move the friction member substantially in one direction.

6. An impact actuator in accordance with claim 5, wherein the controller alternately controls the first driver and the second driver so as to move the friction member substantially in a direction opposite to the one direction.

7. An impact actuator in accordance with claim 1, wherein the first driver and the second driver each performs both charging and discharging.

8. An equipment using an impact actuator comprising:
a piezoelectric element;
a driving member fixed on a first end of the piezoelectric element;
a supporting member fixed on a second end of the piezoelectric element;
a friction member engaged with the driving member by a friction force for causing a relative movement in an axial direction of the driving member;

a first driver for applying a voltage for charging or discharging electric charge to or from the piezoelectric element at a charging speed so as to deform the piezoelectric element in a first direction;

a second driver for applying a voltage for charging or discharging electric charge to or from the piezoelectric element at a charging speed that is substantially the same speed as that of the first driver so as to deform the piezoelectric element in a second direction opposite to the first direction; and a controller for alternately controlling the first driver and the second driver such that the first driver and the second driver have different driving time periods.

9. An equipment in accordance with claim 8, wherein the first driver comprises a first charging and discharging circuit for discharging electric charge in the piezoelectric element to deform the piezoelectric element in a second direction and for charging electric charge to the piezoelectric element to deform the piezoelectric element in a first direction; and the second driver comprises a second charging and discharging circuit for discharging electric charge in the piezoelectric element to deform the piezoelectric element in a first direction and for charging electric charge to the piezoelectric element to deform the piezoelectric element in a second direction.

10. An equipment in accordance with claim 8, wherein the first driver comprises a charging circuit for charging electric charge to the piezoelectric element to deform the piezoelectric element in the first direction; and the second driver comprises a discharging circuit for discharging electric charge in the piezoelectric element to deform the piezoelectric element in the first direction.

11. An equipment in accordance with claim 8, wherein a circuit for serving as the first driver and the second driver is configured as a bridge circuit comprising:

a first series circuit of a first subcircuit and a second subcircuit, each of the first subcircuit and the second subcircuit having a switching element; a second series circuit of a third subcircuit and a fourth subcircuit, each of the third subcircuit and the fourth subcircuit having a switching element, the piezoelectric element being connected between a connection point of the first subcircuit and the second subcircuit and a connection point of the third subcircuit and the fourth subcircuit; and an electric power supply connected between a connection point of the second subcircuit and the third subcircuit and a connection point of the first subcircuit and the fourth subcircuit;

the first driver comprises the electric power supply, the second subcircuit and the fourth subcircuit; and the second driver comprises the electric power supply, the first subcircuit and the third subcircuit.

12. An equipment in accordance with claim 8, wherein the controller alternately controls the first driver and the second driver so as to move the friction member substantially in one direction.

13. An equipment in accordance with claim 12, wherein the controller alternately controls the first driver and the second driver so as to move the friction member substantially in a direction opposite to the one direction.

14. An equipment in accordance with claim 8, wherein the first driver and the second driver each performs both charging and discharging.

* * * * *